United States Patent [19]
Matthews III et al.

[11] Patent Number: 5,838,320
[45] Date of Patent: Nov. 17, 1998

[54] METHOD AND SYSTEM FOR SCROLLING THROUGH DATA

[75] Inventors: Joseph Howard Matthews III, Redmond; James C. Gallant, Seattle, both of Wash.

[73] Assignee: Microsoft Corporation, Redmond, Wash.

[21] Appl. No.: 848,856

[22] Filed: May 2, 1997

(Under 37 CFR 1.47)

Related U.S. Application Data

[63] Continuation of Ser. No. 265,381, Jun. 24, 1994, abandoned.
[51] Int. Cl.[6] .................................. C09G 5/34; G06F 3/14
[52] U.S. Cl. ............................................. 345/341; 345/346
[58] Field of Search ..................................... 345/341, 346, 345/340, 326, 327, 328, 329, 336, 339, 342, 343, 344, 347, 348, 352, 356, 357

[56] References Cited

U.S. PATENT DOCUMENTS

| | | | |
|---|---|---|---|
| 5,196,838 | 3/1993 | Meier et al. ............................... | 340/724 |
| 5,202,961 | 4/1993 | Mills et al. ............................... | 395/159 |
| 5,333,247 | 7/1994 | Gest et al. ................................ | 395/138 |
| 5,353,391 | 10/1994 | Cohen et al. .............................. | 395/25 |
| 5,485,174 | 1/1996 | Henshaw et al. ......................... | 345/123 |
| 5,506,951 | 4/1996 | Ishikawa ................................... | 395/157 |
| 5,528,259 | 6/1996 | Bates et al. ............................... | 345/121 |
| 5,739,817 | 4/1998 | Glei et al. ................................. | 345/341 |

FOREIGN PATENT DOCUMENTS

| | | |
|---|---|---|
| 0 410 579 A2 | 1/1991 | European Pat. Off. . |
| 0 529 770 A2 | 3/1993 | European Pat. Off. . |

OTHER PUBLICATIONS

Mills, Michael et al., "A Magnifier Tool for Video Data," *Abstract, ACM Conference*, pp. 93–98, May 3, 1992.

*Primary Examiner*—Raymond J. Bayrel
*Assistant Examiner*—Steven P. Sax
*Attorney, Agent, or Firm*—Seed and Berry LLP

[57] ABSTRACT

An improved method and system for scrolling through data are provided. An image viewer is used in conjunction with a scroll bar to allow a user to preview which image will be displayed next on a display device. The scroll bar includes a scroll box which may occupy any of several positions within the scroll bar. When a user grabs the scroll box using a mouse, or other pointer-positioning device, the image viewer displays an image corresponding to the position of the scroll box within the scroll bar. As the user drags the scroll box to different positions within the scroll bar, different images are displayed within the image viewer. When the user drops the scroll box, the final image displayed in the image viewer is displayed on the display device.

25 Claims, 5 Drawing Sheets

METHOD AND SYSTEM FOR SCROLLING THROUGH DATA

CROSS-REFERENCE TO RELATED APPLICATION

This application is a continuation of U.S. patent application Ser. No. 08/265,381, filed Jun. 24, 1994, now abandoned.

DESCRIPTION

1. Technical Field

The present invention relates generally to a method and system for controlling the display of data on a display device of a computer system, and more particularly, to such a method and system for aiding a user's scrolling through data on such a system.

2. Background of the Invention

Conventional application programs supporting a graphical user interface provide scroll bars when the size of the data being displayed may exceed the size of a computer system's display area. Scroll bars allow a user of the computer system to use a pointer positioning device such as a mouse to scroll data through the display area, thereby revealing previously undisplayed portions of the data. The display area may have a vertical scroll bar, a horizontal scroll bar, or both. FIG. 1 is an illustration of a display area 10 in which a conventional horizontal scroll bar 12 and a conventional vertical scroll bar 14 are displayed. The horizontal scroll bar 12 includes a left-scroll arrow 18, a right-scroll arrow 20, and a scroll box 28. Similarly, the vertical scroll bar 14 includes an up-scroll arrow 22, a down-scroll arrow 24, and a scroll box 29. Selecting one of the scroll arrows 18, 20, 22, 24 causes the system to move the view of data left, right, up, or down a predefined amount.

The scroll boxes 28, 29 (also known as elevators, thumb tabs, or sliders) move within the scroll bars 12, 14, respectively, to represent how far the current view of data is from the top (for vertical scroll bars) or from the left edge (for horizontal scroll bars) of the data. For example, the scroll box 29 in the vertical scroll bar 14 of FIG. 1 is approximately one quarter of the way down the scroll bar, indicating data being displayed is approximately one quarter of the way down from the beginning of the document or file being displayed. The user may also "drag" the scroll boxes 28, 29 within the scroll bars 12, 14, respectively, to cause a different view of the data to be displayed. If possible, the view is updated continuously as a scroll box is dragged, but if the view cannot be updated continuously with sufficient speed, the view may be updated in a single jump to a new view corresponding to the location of the scroll box at the end of the drag operation. When the view is updated in a single jump, the user is not given any advanced indication as to what will be the new view. After a user has dragged the scroll box to cause a new view to be displayed in the display area, the user cannot easily return to the previous view.

Using a conventional scroll bar system of the type described above, to display a particular view the user must step through each view using the scroll arrows or jump around the data using the scroll boxes. When the data being displayed is text-based, such as a word processing document that is subdivided into pages, a user may use the scroll bars in combination with a displayed page number to locate a particular view. However, when the user does not know the page number the user must still jump around the document to locate a particular view. When the data being displayed is image-based, such as a sequential picture story, a page number is often meaningless and therefore not used to identify each picture; the user is again forced to step through each picture to locate a particular view. Conventional scroll bar systems have thus been found less than optimal for all situations.

The present invention solves the inadequacies of conventional scrolling systems by providing an improved method and system for scrolling through data. The present invention is particularly useful for image-based data.

SUMMARY OF THE INVENTION

In a preferred embodiment of the present invention, an improved method and system for scrolling through data are provided. A display controller such as a scroll bar is used in combination with an image viewer to identify a desired image before the desired image is displayed on a display device. The image display controller is manipulated to cause a sequence of images to be displayed in the image viewer. Once the desired image is identified from the sequence of displayed images, the desired image is displayed on the display device. When a first image is being displayed on the display device, the display of the first image is maintained until it is determined that the sequence of displayed images includes the desired image. When it is determined that the sequence of displayed images includes the desired image, the desired image is displayed on the display device instead of the first image. Thus, the image display controller displays a preview of an image before the image is displayed on the display screen.

In an alternate embodiment of the present invention, the computer system includes a display device and a user-controllable pointer positioning device with signal generating means to control the movement of a pointer on the display device. The image display controller is displayed on a portion of the display device. A user positions the pointer over the image display controller and activates the signal-generating means. An image viewer is displayed on the portion of the display device in response to this user input. Subsequent to the after positioning the pointer over the image display controller and activating the signal-generating means, the user moves the pointer while activating the signal-generating means to cause the image display controller to move. Each movement of the image display controller corresponds to an image. When the user deactivates the signal-generating means, the image that was displayed in the image viewer is displayed on the display device.

DETAILED DESCRIPTION OF THE INVENTION

In a preferred embodiment of the present invention, an improved method and system for scrolling through data are provided. Although the present invention may be used with text-based data, the present invention is particularly useful for scrolling through data containing image-based data, including sequential picture stories and animation sequences. Multimedia software, which may combine video, audio, photographs, text, graphics, animation, and computer programs into one "title" or "show" will especially benefit from the present invention because the present invention improves user interaction with the multimedia software.

Multimedia software executing on a computer system causes, among other things, a plurality of images to be displayed in sequence on a display device of the computer system. The present invention allows a user to quickly locate and select a desired image for display on the display device while maintaining a current display. After the desired image is located and selected, the desired image is displayed on the display device in place of the current display, thereby causing the multimedia software to continue executing from the desired image. To allow a user to quickly locate and select a desired image, the present invention provides an improved scroll bar and an image viewer.

Figure 1:
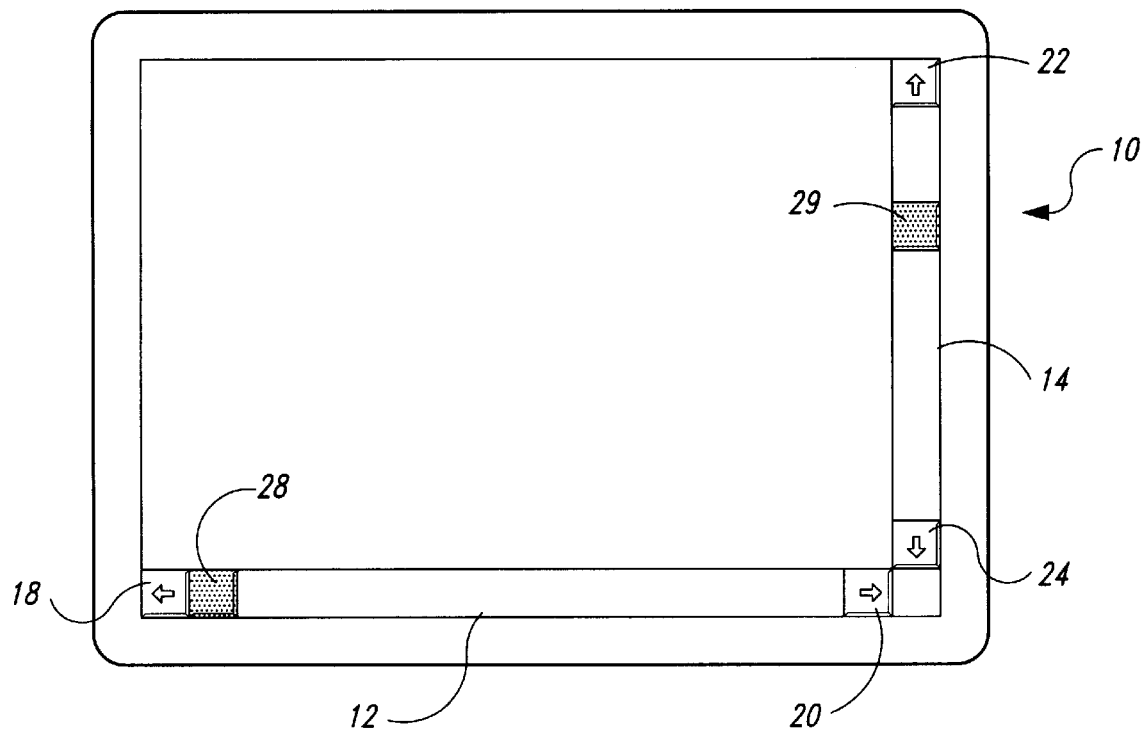
FIG. 1 is an illustration of a conventional horizontal and vertical scroll bar displayed in a display area.
Figure 2:
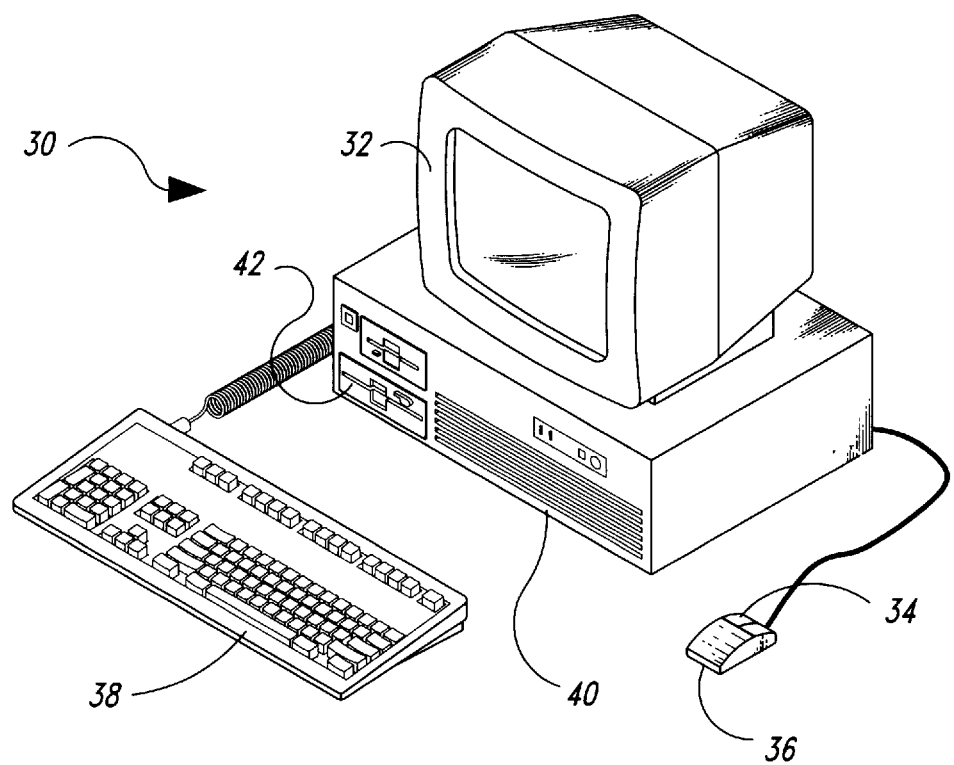
FIG. 2 is an illustration of a computer system having a display device in accordance with a preferred embodiment of the present invention.

FIG. 2 is an illustration of a computer system 30 in accordance with a preferred embodiment of the present invention. The computer system 30 includes a computer 40 having the usual complement of memory and logic circuits, a display device 32, a keyboard 38 or other input device, and a mouse 36 or other pointing device. The mouse 36 includes a signal generating means 34 such as a mouse button. Data, including digital images, is stored in a digital format on a storage device 42 such as a CD ROM drive. As multimedia software is executing on the computer 40, images are downloaded from the storage device 42 and displayed on the display device 32.

Figure 3:
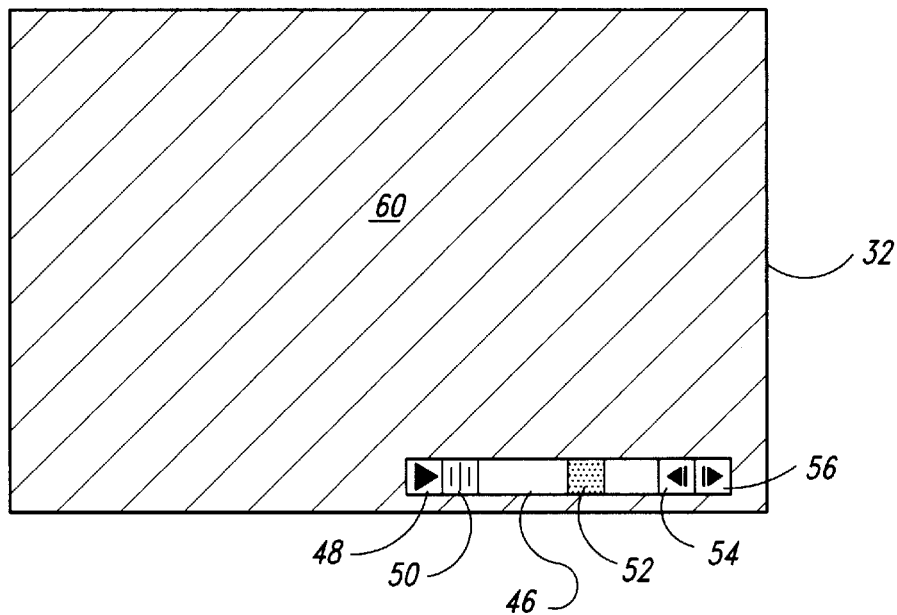
FIG. 3 is an illustration of a first image and an improved scroll bar displayed on the display device of FIG. 2 in accordance with a preferred embodiment of the present invention.

FIG. 3 is an illustration of a first image 60 and an improved scroll bar 46 displayed on the display device 32 in accordance with a preferred embodiment of the present invention. Execution of the multimedia software causes a sequence of images, including the first image 60, to be displayed on the display screen 32. The improved scroll bar 46 preferably includes a play button 48, a pause button 50, a scroll box 52, a previous button 54, and a next button 56. Activation of the pause button 50 temporarily pauses execution of the multimedia software. While execution of the multimedia software is paused, the image that was displayed when the pause button 50 was activated is displayed until the play button 48 is activated. Activation of the play button 48 causes the multimedia software to continue executing on the computer 40. Activation of the previous button 54 causes an image preceding the first image 60, if one exists in the sequence of images, to be displayed on the display device 32. Activation of the next button 56 causes an image following the first image 60, if one exists, in the sequence of images to be displayed on the display device 32. One method of activating a "button" on the improved scroll bar 46 includes using the mouse 36 to position a pointer over the button and then depressing and releasing the mouse button 34. Other methods of activating a button are well known.

The scroll box 52 slides from one end of the scroll bar to the other end as execution of the multimedia software progresses. Each position of the scroll box 52 within the improved scroll bar 46 corresponds to the one of sequence of images being displayed on the display device 32; the current position of the scroll box 52 corresponds to the first image 60. Activation of either the previous button 54 or the next button 56 causes the scroll box 52 to move to another position within the scroll bar 46. As with conventional scroll bars, a user may jump to a new location within the multimedia software, thereby causing a new image to be displayed on the display device 32, by dragging the scroll box 52 to a new location within the improved scroll bar 46. One method of dragging the scroll box 52 includes using the mouse 36 to position the pointer over the scroll box 52 and depressing the mouse button 34. This is known as selecting the scroll box 52. Movement of the mouse 36 while the scroll box 52 is selected will cause similar movement of the scroll box 52. Other dragging techniques are well known.

Figure 4:
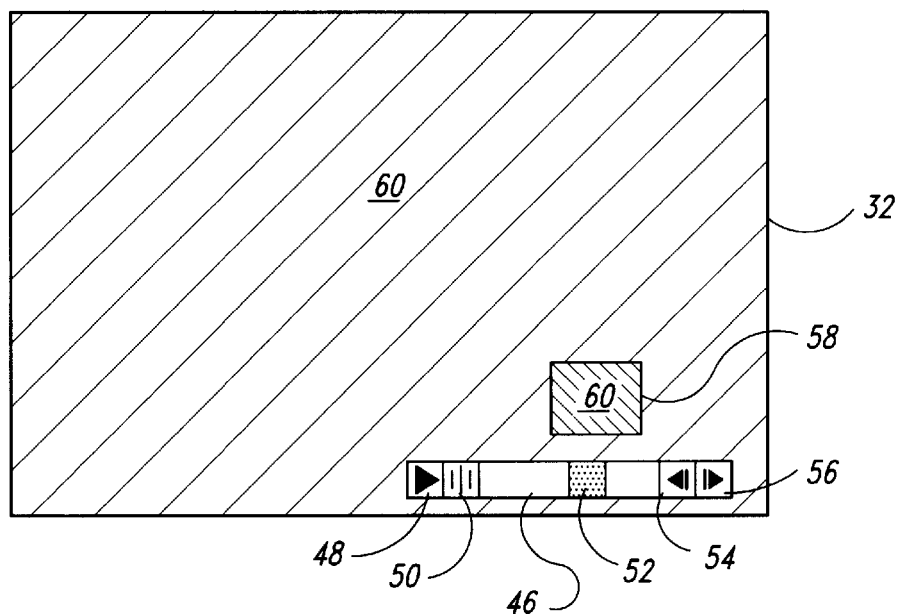
FIG. 4 is an illustration of the first image, the improved scroll bar, and an image viewer displayed on the display device of FIG. 2 in accordance with a preferred embodiment of the present invention.

FIG. 4 is an illustration of the first image 60, the improved scroll bar 46, and an image viewer 58 displayed on the display device 32 in accordance with a preferred embodiment of the present invention. When a user selects the scroll box 52, execution of the multimedia software is paused and the image viewer 58 is displayed on the display device. Images are displayed within the image viewer 58. The image displayed within the image viewer 58 corresponds to the position of the scroll box 52 within the improved scroll bar 46. The image viewer 58 allows the user to peruse the sequence of images without jumping to a new location within the multimedia software. Because the current location of the scroll box 52 within the improved scroll bar 46 corresponds to the first image 60, the first image 60 is displayed within the image viewer 58 when the scroll box 52 is selected.

Figure 5:
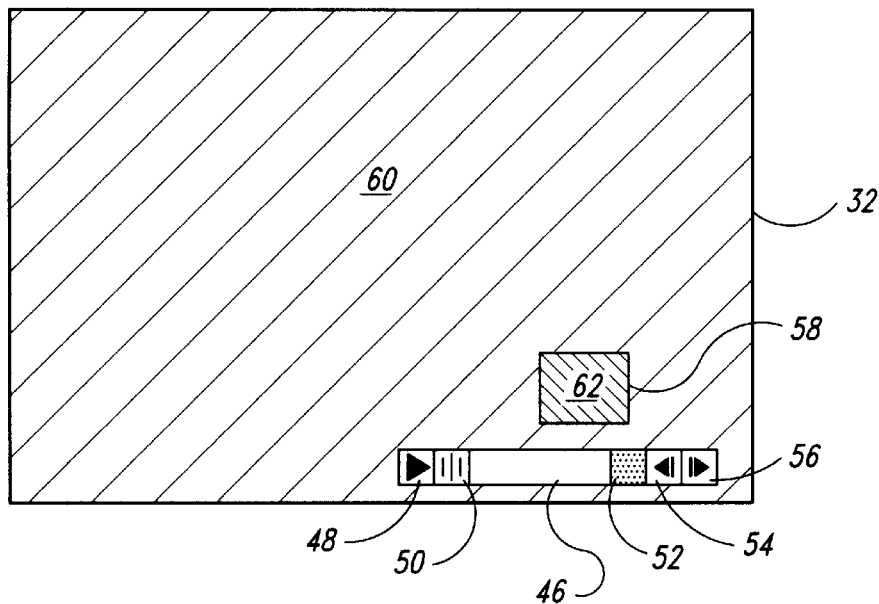
FIG. 5 is an illustration of the first image, the improved scroll bar, and the image viewer of FIG. 3, and a second image displayed within the image viewer in accordance with a preferred embodiment of the present invention.
Figure 6:
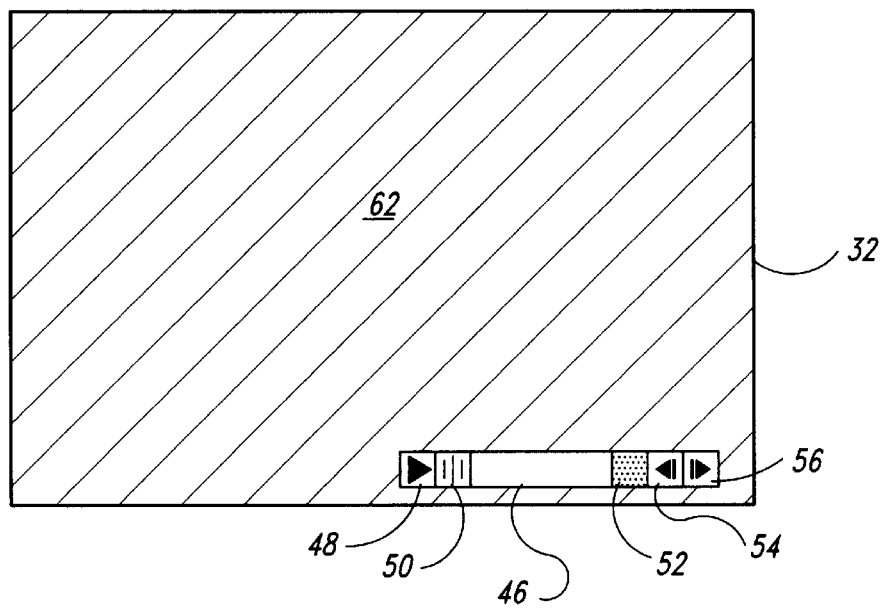
FIG. 6 is an illustration of the second image and the improved scroll bar displayed on the display device of FIG. 2 in accordance with a preferred embodiment of the present invention.

As the user drags the scroll box 52 to a new position within the improved scroll bar 46 while the scroll box 52 is selected, different images are displayed within the image viewer 58. FIG. 5 is an illustration of the first image 60, the improved scroll bar 46, and the image viewer 58 displayed on the display device 32; a second image 62 is displayed within the image viewer 58. The second image 62 corresponds to the new position of the scroll box 52 within the improved scroll bar 46 while the scroll box 52 is selected. When the user de-selects or "drops" the scroll box 52, the second image 62 will be preferably displayed on the display device 32 in place of the first image 60, the image viewer 58 will disappear, and execution of the multimedia software will continue. FIG. 6 is an illustration of the second image 62 and the improved scroll bar 46 displayed on the display device 32. The image viewer 58 shown in FIGS. 4 and 5 is no longer displayed on the display device 32. Alternatively, the image viewer 58 may remain displayed on the display device 32 at all times.

The improved scroll bar 46 and the image viewer 58 provided by the present invention allow a user to quickly search for a desired image without changing the flow of execution of the multimedia software. The image viewer 58 preferably displays a reduced size image, just large enough so that the user may quickly view an image. The computer 40 will cause a reduced-size image to be displayed on the display device 32 much faster than a full-sized image. For example, a typical computer might take 5 seconds to download a full-sized image from a storage device to a display device. If the multimedia software consists of 100 images, then at least 500 seconds are required to display all 100 images. The same computer might take one half of one second to display a reduced-size image. The present invention therefore allows 100 images to be viewed in approximately 50 seconds instead of 500 seconds.

Figure 7:
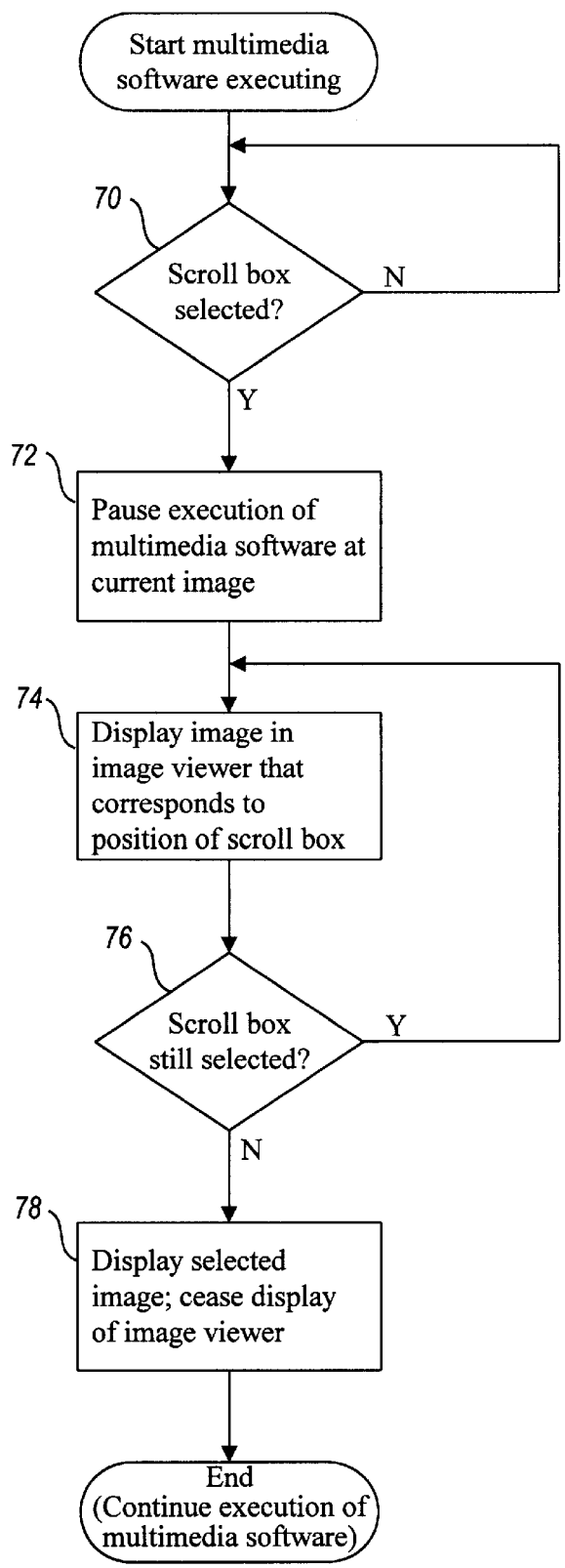
FIG. 7 is a flow diagram of a scrolling method used in accordance with a preferred embodiment of the present invention.

FIG. 7 is a flow diagram of a scrolling method used in accordance with a preferred embodiment of the present invention. It is assumed that the scrolling method is initiated after the multimedia software has begun executing on the computer 40. In step 70, the scrolling method determines whether the scroll box 52 has been selected. If the scroll box has not been selected, then the scrolling method repeats step 70 until the scroll box is selected. As soon as the scroll box is selected, in step 72 the scrolling method causes execution of the multimedia software, causing the current image to remain displayed on the display device. The current image is the image which is being displayed when the scroll box is selected. In step 74, the scrolling method causes the image viewer to be displayed on the display screen. Steps 72 and 74 may occur concurrently. Within the image viewer, the scrolling method causes a reduced-size image to be displayed. The reduced size image that is displayed within the image viewer corresponds to the position of the scroll box within the scroll bar. As the user moves the scroll box within the scroll bar, different images are displayed within the image viewer. In step 76, the scrolling method determines whether the scroll box is still selected. If the scroll box is still selected, then the scrolling method loops back to step 74. When the scroll box is no longer selected, in step 78 the scrolling method causes the image that was displayed within the image viewer to be displayed in full size on the display device. The scrolling method also causes the image viewer to be removed from display on the display device. After step 78, the multimedia software continues executing.

Although the present invention has been described in terms of a preferred embodiment, it is not intended that the invention be limited to this embodiment. Modifications within the spirit of the invention will be apparent to those skilled in the art. For example, those skilled in the art will appreciate that the improved scroll bar and the image viewer need not appear as illustrated herein and further may be displayed at any location on the display device, and may be any size or shape. Additionally, the image viewer 58 may be displayed on the display device 32 in response to a user activating the previous button 54 or the next button 56. For example, if the previous button 54 or the next button 56 is activated for a predefined amount of time, then the image viewer would be displayed on the display device and a sequence of images would be displayed within the image viewer. The scope of the present invention is defined by the claims which follow.

We claim:

1. A method in a computer system for controlling the display of a sequence of images on an image area of a display device, the method comprising:

simultaneously with displaying the sequence of images on the image area, displaying a scroll bar with a scroll box on the display device, the relative position of the scroll box within the scroll bar corresponding to the relative position of the currently displayed image within the sequence of images;

in response to a user dragging the scroll box, suspending the display of the sequence of images on the image area of the display device and sequentially displaying reduced-sized images having a relative position within the sequence of images corresponding to the position of the scroll box within the scroll bar; and when the user stops dragging the scroll box, resuming display of the sequence of images on the image area of the display device starting with the image having a relative position within the sequence of images corresponding to the position of the scroll box within the scroll bar.

2. A method in a computer system for selecting one of a plurality of images to be displayed within an image area of a display device, the method comprising:

displaying a scroll bar with a scroll box on the display device;

in response to a user dragging the scroll box, sequentially displaying a subset of the plurality of images within an image viewer on the display device, wherein the image viewer shows a representation of the same images that are able to be displayed in the image area; and when the user stops dragging the scroll box, displaying within the image area of the display device the image currently being displayed within the image viewer, wherein the image area is separate from the image viewer, whereby the user can view a plurality of images that are displayed within the image viewer for previewing images before being displayed in the image area.

3. The method of claim 2 wherein the step of displaying an image viewer includes displaying the image viewer in such a way that the image viewer does not substantially block the display of an image on the image device.

4. The method of claim 2 wherein the scroll bar further includes a previous button and wherein the step of displaying an image viewer includes displaying the image viewer in response to user activation of the previous button.

5. The method of claim 2 wherein the scroll bar further includes a next button and wherein the step of displaying an image viewer includes displaying the image viewer in response to user activation of the next button.

6. The method of claim 5 wherein the computer system has a user-controllable pointer positioning device with signal generating means, the user-controllable pointer positioning device controlling the position of a pointer displayed on the display device, and wherein the step of displaying an image viewer includes displaying the image viewer within the portion of the display area in response to actuation of the signal generating means while the pointer is positioned over the scroll bar.

7. A computer system for displaying to a user a sequence of images on a display device, the system displaying the sequence of images such that the user may skip forward or backward over a number of images from the currently displayed image in order to resume display of the sequence of images at a different image within the sequence of images, the computer system comprising:

a scroll bar for manipulating the display of the sequence of images on the display device, the scroll bar including a scroll box, the scroll box initially occupying a first position within the scroll bar corresponding to the first image of the sequence of images, each successive position within the scroll bar corresponding to each successive image of the sequence of images, the display device displaying the image of the sequence of images corresponding to the position of the scroll box within the scroll bar when the scroll box is not selected by the user; and an image viewer that displays a reduced-scale image from the sequence of images, the image viewer displayed over a portion of an image displayed on the display device, the reduced-scale image displayed by the image viewer corresponding to the image of the sequence of images indicated by the position of the scroll box within the scroll bar, the image viewer displaying successive images in a forward or backward direction through the sequence of images after a user first selects the scroll box within the scroll bar and then moves the scroll box.

8. The system of claim 7 wherein the image viewer is displayed when the user starts dragging the scroll box.

9. The system of claim 7 wherein the image viewer is removed from display device when the user stops dragging the scroll box.

10. The computer system according to claim 7 wherein the image viewer is positioned in such a way that the image viewer does not substantially block the display of the image displayed by the display device.

11. The computer system according to claim 7 wherein the scroll bar further includes a previous button and wherein the image viewer is displayed in response to user activation of the previous button.

12. The computer system according to claim 7 wherein the scroll bar further includes a next button and wherein the image viewer is displayed in response to user activation of the next button.

13. The computer system according to claim 7 wherein the user may cease display of the image viewer.

14. The computer system according to claim 7 wherein the scroll bar is displayed on the display device.

15. The computer system according to claim 7 further comprising a user-controllable pointer positioning device with signal generating means for controlling the position of a pointer displayed on the display device, and wherein the image viewer is displayed within the portion of the display area in response to actuation of the signal generating means while the pointer is positioned over the scroll box.

16. A computer-readable medium containing instructions for causing a computer system to select one of a plurality of images to be displayed within an image area of a display device, the method comprising:

in response to a user indicating to scroll, sequentially displaying a subset of the plurality of images within an image viewer on the display device, wherein the image viewer shows a representation of the same images that are able to be displayed in the image area; and when the user stops indicating to scroll, displaying within the image area of the display device the image currently being displayed within the image viewer, wherein the image area is separate from the image viewer, whereby the user can view a plurality of images that are displayed within the image viewer for previewing images before being displayed in the image area.

17. The computer-readable medium of claim 16 wherein the image viewer is displayed when the user starts indicating to scroll.

18. The computer-readable medium of claim 16 wherein the image viewer is removed from display device when the user stops indicating to scroll.

19. The computer-readable medium of claim 16 wherein the image viewer overlays a portion of the image area.

20. The computer-readable medium of claim 16 wherein each image that is displayed in the image viewer overlays the image that was previously displayed in the image viewer.

21. The computer-readable medium of claim 16 wherein each image that is displayed in the image area overlays the image that was previously displayed in the image area.

22. The computer-readable medium of claim 16 wherein the step of displaying an image viewer includes displaying the image viewer in such a way that the image viewer does not substantially block the display of an image on the image device.

23. The computer-readable medium of claim 16 wherein the step of displaying an image viewer includes displaying the image viewer in response to user activation of a previous button.

24. The computer-readable medium of claim 16 wherein the step of displaying an image viewer includes displaying the image viewer in response to user activation of a next button.

25. The computer-readable medium of claim 19 wherein the computer system has a user-controllable pointer positioning device with signal generating means, the user-controllable pointer positioning device controlling the position of a pointer displayed on the display device, and wherein the step of displaying an image viewer includes displaying the image viewer within the portion of the display area in response to actuation of the signal generating means while the pointer is positioned over a scroll box.

* * * * *